Patented Aug. 5, 1924.

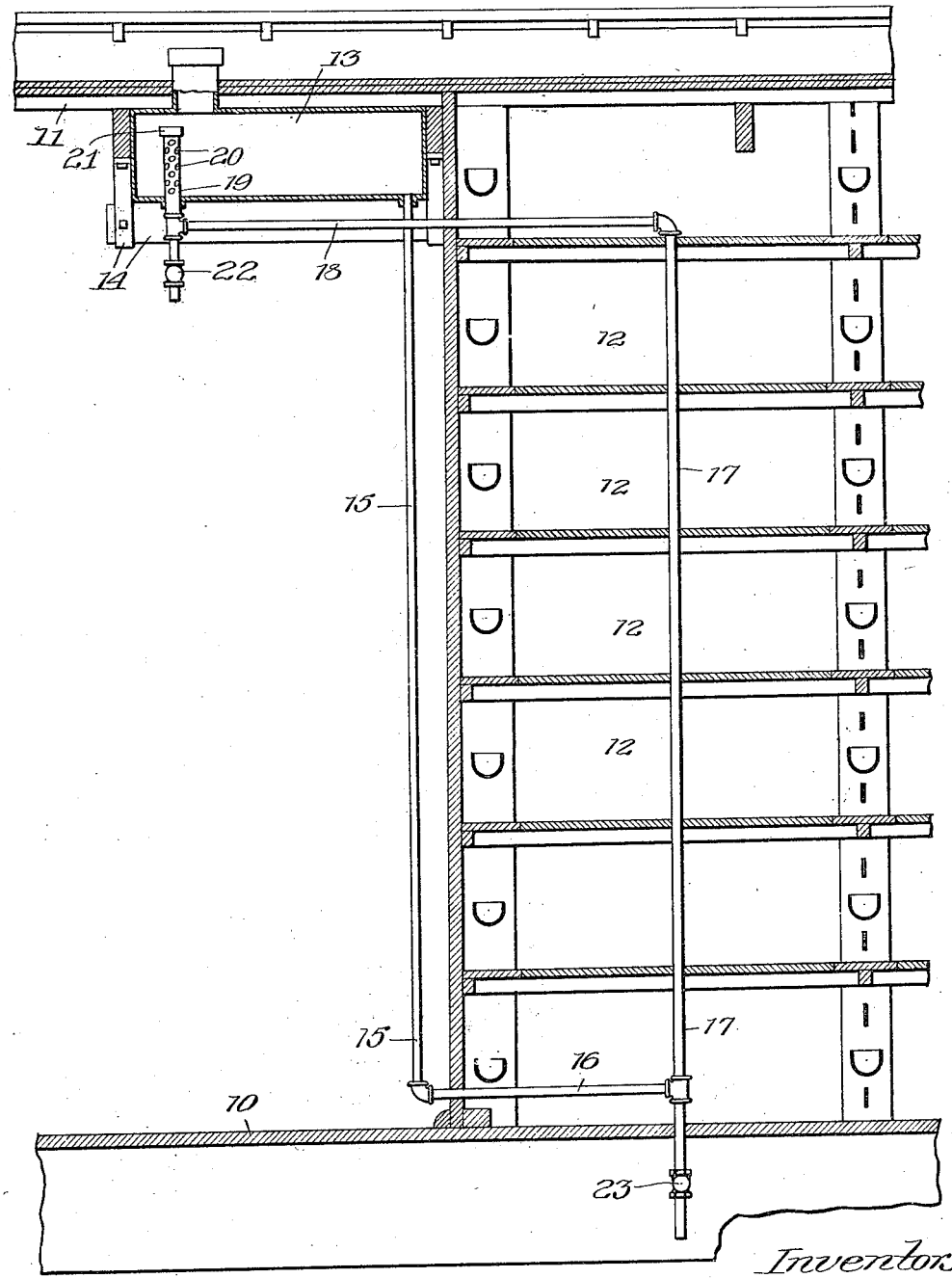

1,503,911

UNITED STATES PATENT OFFICE.

JOHN J. MURPHY AND ARTHUR T. CANN, OF CHICAGO, ILLINOIS, ASSIGNORS, BY MESNE ASSIGNMENTS, TO EQUIPMENT DEVICES COMPANY, A CORPORATION OF DELAWARE.

TANK HEATER FOR POULTRY CARS.

Application filed August 22, 1923. Serial No. 658,795.

*To all whom it may concern:*

Be it known that we, JOHN J. MURPHY and ARTHUR T. CANN, citizens of the United States, residing at Chicago, in the county of Cook and State of Illinois, have invented a new and useful Improvement in Tank Heaters for Poultry Cars, of which the following is a specification.

This invention relates to tank heaters for poultry cars and the like and is fully described in the following specification and shown in the accompanying drawing in which the figure is a partial vertical longitudinal section through a poultry car embodying the invention.

This car has a main floor 10 and a roof 11 between which is located a number of poultry coops 12 in any well known manner.

A feed water tank 13 is secured near the roof by means of suitable supports 14 and has a descending pipe 15 leading therefrom. This connects to a horizontal pipe 16 with an ascending pipe 17 which in turn connects with the bottom of the feed tank 13 by means of another horizontal pipe 18 and a pipe 19 which preferably extends into the tank 13, and is perforated by means of holes 20 and has a cap 21.

The ascending pipe 17 is located near the center of the coops through which it passes so that it is surrounded by the bodies of the chickens which are being transported in these coops. The heat received from the chickens is sufficient to raise the temperature of the water in the pipe 17 and this rise in temperature causes the water to ascend in the pipe 17 while cool water descends through the pipe 15 to take its place. In this way a circulation takes place through the loop of pipe, the warm water rising to the tank 13 so as to prevent freezing of the water in the tank 13 which might otherwise occur.

Drain cocks 22 and 23 are provided for draining water from the system, the latter being in the low point of the loop.

While I have shown and described certain embodiments of my invention, it is to be understood that it is capable of many modifications. Changes therefore in the construction and arrangement may be made without departing from the spirit and scope of the invention as disclosed in the appended claims, in which it is my intention to claim all novelty inherent in my invention as broadly as possible in view of the prior art.

We claim:

1. In a poultry car, tiers of coops arranged one above the other, a water tank near the top of the car, a descending piece of pipe leading from said tank on the outside of said coops, an ascending piece of pipe passing up through said coops and into said tank, and a piece of pipe connecting the bottom ends of said pieces of pipe, whereby the heat from the bodies of chickens in the coops will heat the water in said ascending piece of pipe and cause the water in said ascending piece of pipe to flow toward the tank.

2. In a poultry car, tiers of coops arranged one above the other, a water tank near the top of the car, a descending piece of pipe leading from said tank on the outside of said coops, an ascending piece of pipe passing up through said coops and into said tank, a piece of pipe connecting the bottom ends of said pieces of pipe, whereby the heat from the bodies of chickens in the coops will heat the water in said ascending piece of pipe and cause the water in said ascending piece of pipe to flow toward the tank, and a perforated end on said ascending piece of pipe within the tank.

JOHN J. MURPHY.
ARTHUR T. CANN.